Oct. 15, 1963    YOSHIHISA MAITANI    3,106,882
SAFETY DEVICE FOR PHOTOGRAPHIC CAMERA
Filed Nov. 28, 1961    3 Sheets-Sheet 3
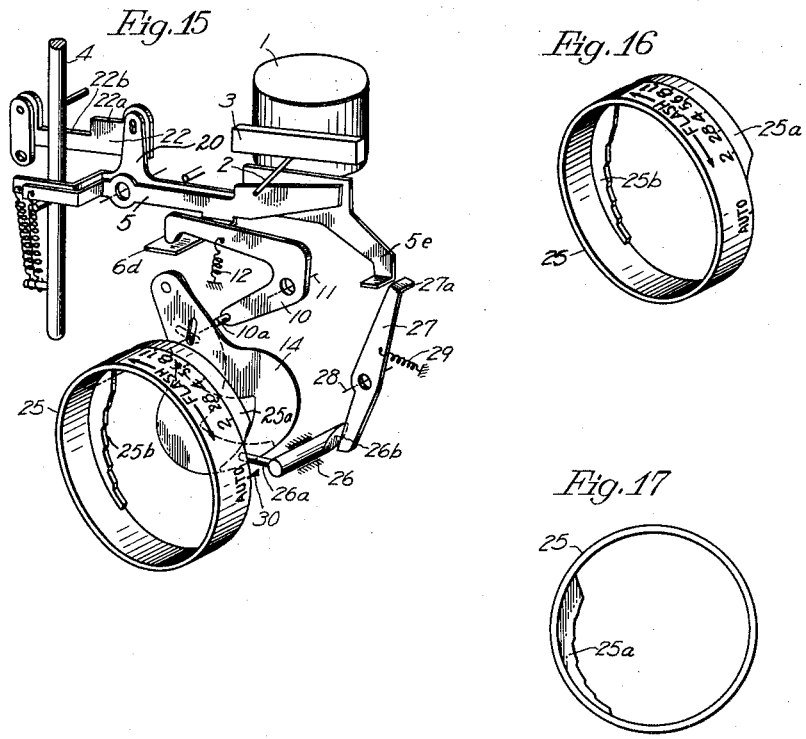
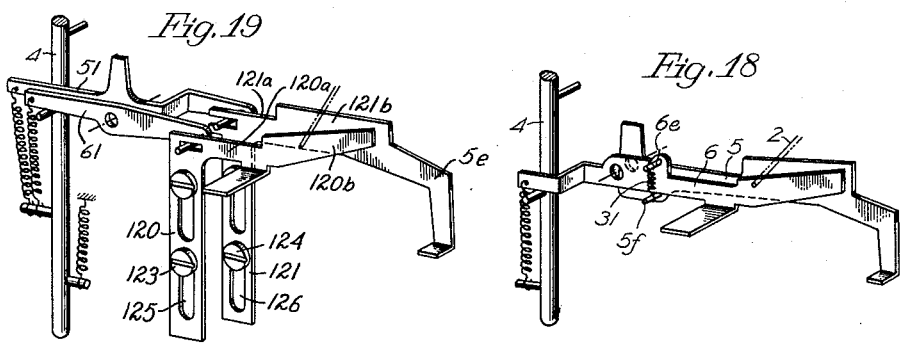

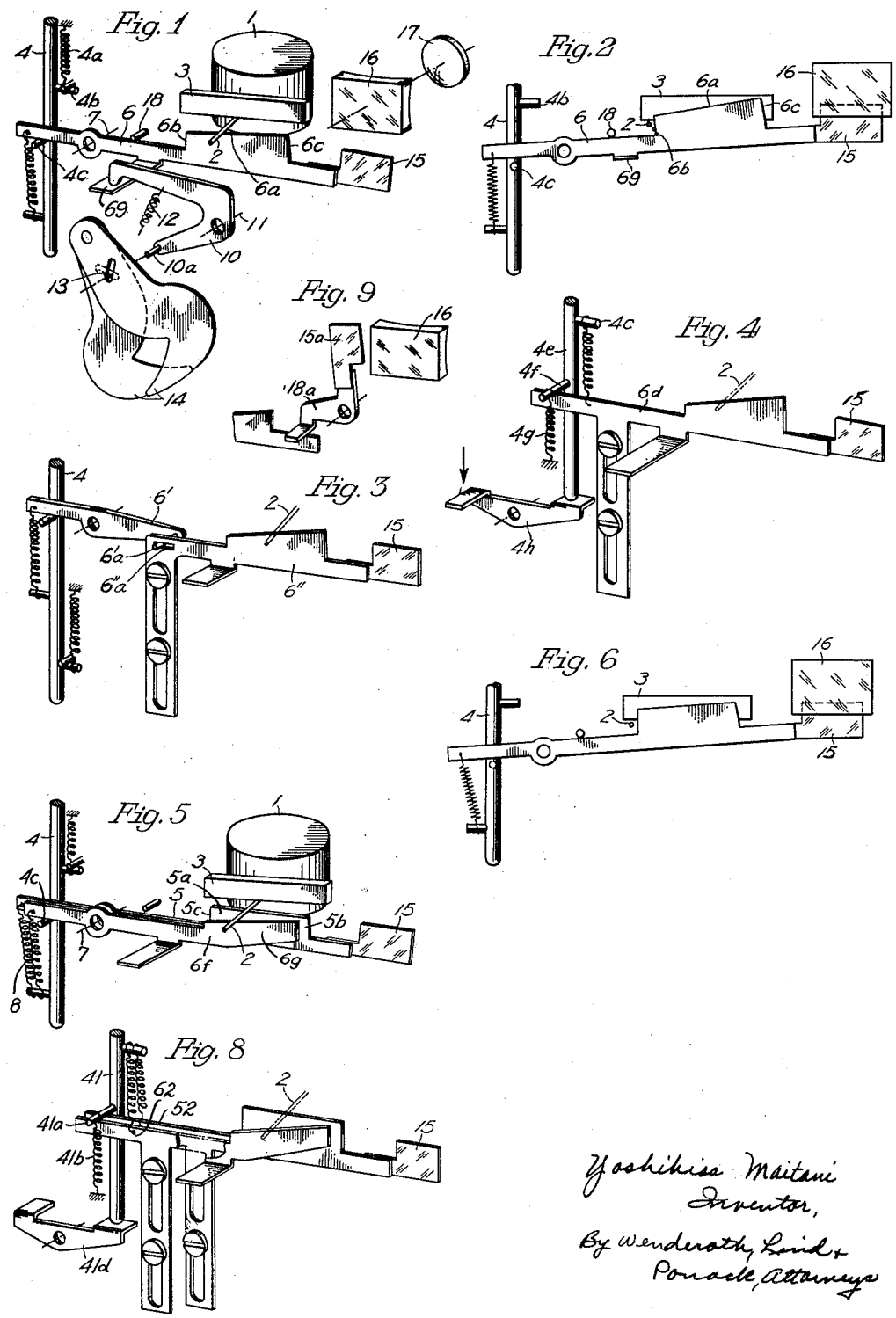

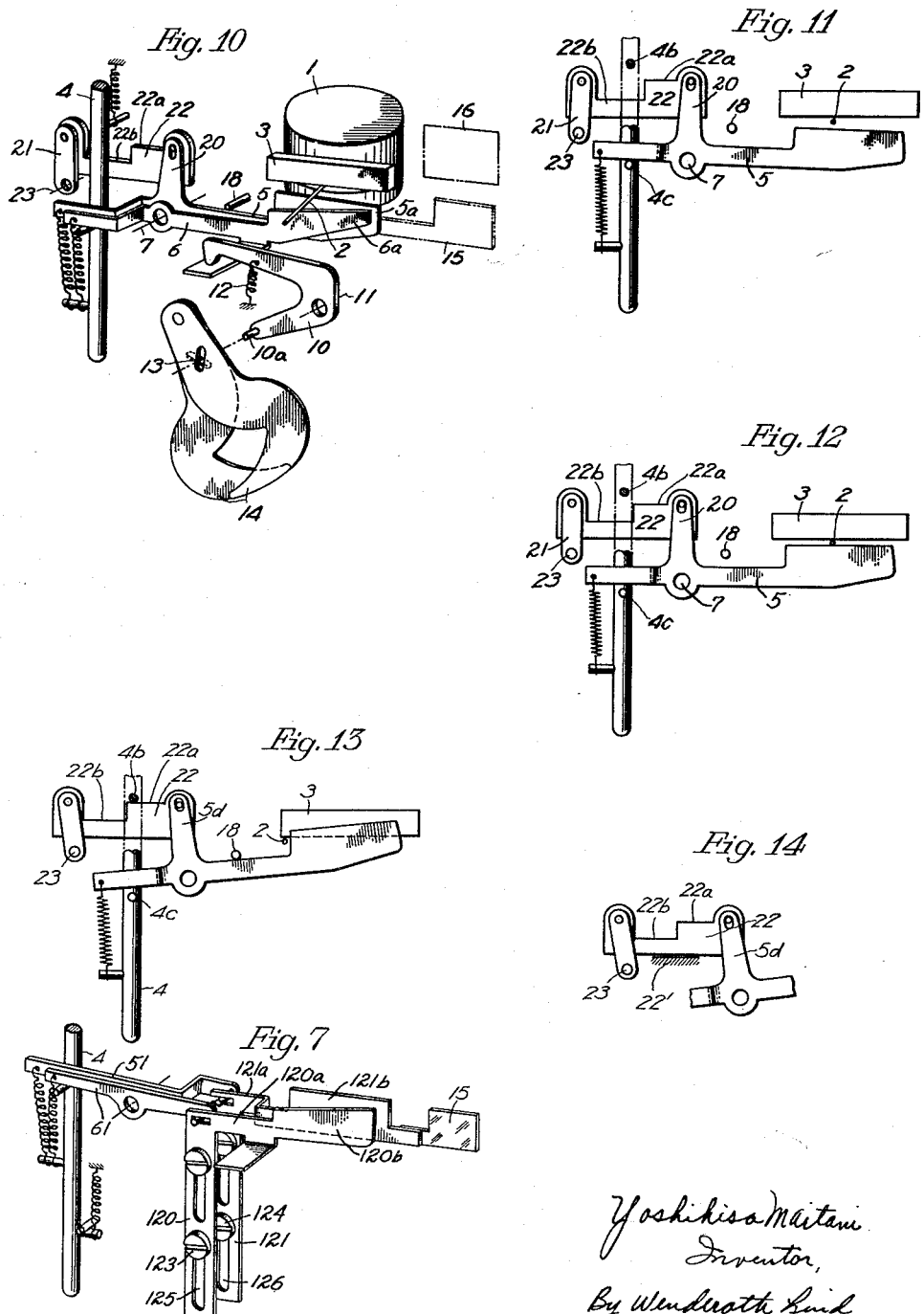

United States Patent Office 3,106,882
Patented Oct. 15, 1963

3,106,882
SAFETY DEVICE FOR PHOTOGRAPHIC CAMERA
Yoshihisa Maitani, Tokyo, Japan, assignor to Olympus Kogaku Kogyo Kabushiki Kaisha, Tokyo, Japan, a corporation of Japan
Filed Nov. 28, 1961, Ser. No. 155,404
Claims priority, application Japan Dec. 5, 1960
12 Claims. (Cl. 95—10)

This invention relates to a safety device for a photographic camera of the type including an exposure meter and a diaphragm mechanism controlled by the exposure meter.

An object of the invention is to provide in a photographic camera of the type including therein an exposure meter and a diaphragm mechanism controlled by the same, a warning device for visually warning the user that an indicator element of the exposure meter is not in its proper position whenever the same is in such position, upon depressing a shutter releasing element.

Another object of the invention is to provide in a photographic camera of the type including therein an exposure meter and a diaphragm mechanism controlled by the same, a locking device for locking a shutter releasing element in its inoperative position whenever an indicator element of the exposure meter is not in its proper position.

A further object of the invention is to provide a photographic camera of the type including therein an exposure meter and a diaphragm mechanism controlled by the same and further including both a warning device and a locking device above described.

Another object of the invention is to provide, in a photographic camera of the type including therein an exposure meter, a diaphragm mechanism controlled by the same and a locking device for locking a shutter releasing element in its inoperative position whenever an indicator element of the exposure meter is not in its proper position, manually operated means for releasing the locking device.

The invention will become more readily apparent from the following detailed description taken in conjunction with the accompanying drawings in which:

FIG. 1 shows schematically a perspective view of one form of a device constructed in accordance with the teachings of the invention;

FIG. 2 shows a fragmental elevational view of the device illustrated in FIG. 1 and in its operated position;

FIG. 3 shows schematically a fragmental perspective view of a modification of the device illustrated in FIG. 1;

FIG. 4 shows schematically a fragmental perspective view of another modification of the device illustrated in FIG. 1;

FIG. 5 shows schematically a perspective view of another form of a device constructed in accordance with the teachings of the invention with certain components omitted;

FIG. 6 shows a fragmental elevational view of the device illustrated in FIG. 1 and in its operated position;

FIG. 7 shows a view similar to FIG. 3 and illustrating a modification of the device of FIG. 5;

FIG. 8 shows a view similar to FIG. 4 and illustrating another modification of the device of FIG. 5;

FIG. 9 shows a fragmental perspective view of a modification of a warning member shown in FIG. 1;

FIG. 10 shows schematically a perspective view of still another form of a device constructed in accordance with the teachings of the invention;

FIGS. 11 to 13 show fragmental elevational views of the device shown in FIG. 10 and in its various operated positions;

FIG. 14 shows schematically an elevational view of a safety device according to the teachings of the invention in its operated position;

FIG. 15 shows schematically a perspective view of another modification wherein a manually operated mechanism for controlling a diaphragm aperture is incorporated into the device illustrated in FIG. 10;

FIG. 16 shows a perspective view of a manually operated ring for controlling a diaphragm aperture and illustrated in FIG. 15;

FIG. 17 shows a front plan view of the controlling ring illustrated in FIGS. 15 and 16;

FIGS. 18 and 19 show schematically perspective views of modifications of the invention with certain components omitted.

Throughout the drawings like reference numerals designate similar components.

Referring now to FIG. 1 of the drawings, there is illustrated an exposure controlling device with a warning member constructed in accordance with the teachings of the invention. An exposure meter included in housing of a photographic camera (not shown) comprises a photocell (not shown), and a galvanometer 1 electrically connected to the same and including an indicating pointer 2. Disposed adjacent and substantially parallel to the movement passage of the indicating pointer 2 is a holding stationary plate 3. An operating rod 4 for releasing a shutter (not shown) is disposed for longitudinal movement and normally biased in the upward direction as viewed in FIG. 1 by the action of a tensioning spring 4a having one end suitably secured to the housing and the other end hooked on a projection 4b formed on the rod. The operating rod 4 is adapted to be driven directly or indirectly by a shutter releasing pushbutton or the like (not shown).

According to the invention a device for controlling a diaphragm aperture comprises a rockable lever 6 pivotably mounted to its fulcrum diagrammatically designated at dotted-and-dashed line 7. The lever includes one arm resiliently engaging the operating rod 4 on a projection 4c extending laterally from the same, by the action of a tensioning spring 9 disposed therebetween to press against the projection 4c and the other arm having a free end portion which, in turn is provided on the upper side as viewed in FIG. 1 with a protrusion 6a extending throughout an effective range over which the indicating pointer 2 of the galvanometer 1 can be moved or swung in accordance with an amount of light falling upon the photocell from an object to be photographed whereby the pointer indicates a light value for the object.

It is assumed that, as the amount of light falling upon the photocell the indicating pointer 2 will be moved from the right toward the left as viewed in FIG. 1. It is also assumed that, when the pointer is on the right side of the righthanded end of the protrusion 6a as viewed in FIG. 1 there is a zero indication while if the pointer will be swung beyond the left end of the protrusion the same will be in over-swung position. As shown in FIG. 1, the protrusion 6a includes at both ends its edges 6b and 6c extending downwardly and substantially perpendicularly to the longitudinal axis of the lever 6.

The other arm of the lever 6 includes further a branch arm 6d extending forwardly (as viewed in FIG. 1) from the same and substantially perpendicularly to the plane of the lever. The branch arm 6d includes its free end portion on which one end of a bell crank 10 rests. The bell crank 10 is pivotally mounted to its fulcrum diagrammatically designated at dotted-and-dashed line 11 and normally biased in the counterclockwise direction as viewed in FIG. 1 by the action of a spring 12. The bell crank 10 includes a pin 9a secured to the other end and adapted to be loosely fitted into a throughout opening 13 formed of a pair of cross slots formed on a pair of diaphragm blades of substantially sickle shape 13 adjacent to a position where the blades are pivotably mounted to a stationary member (not shown) in the housing. The diaphragm blades 14 are provided on those portion thereof opposite to their pivoted portion with opposed recesses to provide a diaphragm aperture.

According to the invention the lever 6 is further on a suitable portion thereof, for example at the free end of the other arm with a colored warning element of transparent material 15 adapted to enter in and retrograde from an optical path of a view finder system shown as comprising an object glass 16 and an eyepiece 17.

When a photographic camera including the device thus far described is turned to an object to be photographed the indicating pointer 2 of the galvanometer 1 will be moved toward the left as viewed in FIG. 1 in accordance with an amount of light falling upon the photocell from the object. It is now assumed that the moved pointer 2 is at a point above the length of the protrusion 6a. Then operating rod 4 can be depressed directly or indirectly by the operation of a shutter pushbutton (not shown) to rotate or rock the lever 6 in the counterclockwise direction as viewed in FIG. 1 through the action of the spring 8. By this counterclockwise rotational or rocking movement of the lever 6 the protrusion 6a will press the indicating pointer 2 against the holding plate 3 to hold the pointer against the same. This prevents further rotational or rocking movement of the lever 6.

The rotational or rocking movement of the lever 6 effects the counterclockwise rotational movement, as viewed in FIG. 1, of the bell crank 12 through the branch arm 69 to drive the diaphragm blades resulting variation in the diaphragm aperture. As shown in FIG. 1 the protrusion 6a includes an operating edge suitably tilted to the movement passage of the pointer 2 or the lower side of the holding plate 2. Therefore, it will be appreciated that the magnitude of movement of the lever 6 depends upon the position of the pointer 2 relative to the operating edge of the protrusion. As a result, the diaphragm aperture provided by the opposed recesses of the diaphragm blades 14 can be controlled in accordance with the position of the pointer 2 relative to the tilted edge of the protrusion 6a to be ready for providing the proper or optimum exposure. It is to be understood that, instead of the diaphragm aperature controlling mechanism illustrated any of conventional mechanism may be used which is responsive to the rotational or rocking movement of the lever 6 for controlling a diaphragm aperture to the optimum stop number.

The rotational movement of the lever 6 effects also the movement of the warning element 15 toward the optical path of the view finder system 16—17. In this case, however, the warning element 15 is not allowed to enter such an optical path because of relatively small movement of the lever 6.

If an object to be photographed will have its brightness excessively low or excessively high then the indicating pointer 2 of the galvanometer 1 will be scarcely moved or be in its over-swung position. In other words, the indicating pointer 2 will not be above the protrusion 6c. In such a case, if the operating rod 4 will be depressed, the lever 6 will be rotated about its fulcrum 7 in the counterclockwise direction but the protrusion 6a will not engage the indicating pointer 2. Finally the lever will abut against a stopper 18 disposed above the same whereupon the lever will be stopped in its position illustrated in FIG. 2. As clearly shown in FIG. 2, the warning element 14 enters the optical path of the view finder system 16—17 to warn the user that the indicating pointer 2 is not within its effective range.

Referring now to FIG. 3 of the drawings, there is illustrated a modification of the device shown in FIG. 1. An exposure controlling lever device illustrated comprises a lever 6 including one two part arm adapted to be operatively coupled to a shutter mechanism (not shown) or diaphragm mechanism (not shown) with the remaining portions substantially similar to the corresponding portions of the device shown in FIG. 1. As shown in FIG. 3 the two-part arms include an arm portion 6′ integral with the other arm and an arm portion 6″ adjustably connected to the one arm portion. To this end, a pin 6′a provided on the integral arm portion at its free end may be fitted into a slot 6″a formed on the arm portion at one end.

An arrangement illustrated in FIG. 4 is substantially similar to that shown in FIG. 1 except that a controlling lever 6d resiliently engages an operating rod 4e for a shutter (not shown) on the underside of a projection 4f secured thereto and that the rod 4e is normally biased downwardly by the action of spring 4g. The operating rod 4e includes its lower end engaging an intermediate lever 4h at one end which, in turn includes the other end adapted to be depressed directly or indirectly by a shutter pushbutton (not shown) in the direction of arrow illustrated in FIG. 4. The depression of the other end of the intermediate lever 4d tends to move the operating rod 4e upwardly and thereby allow the controlling levers 6 to move in the counterclockwise direction as viewed in FIG. 4. Therefore, it will be apparent that the device shown in FIG. 4 will be operated in the same manner as does the device previously described in conjunction with FIG. 1.

Referring now to FIG. 5 of the drawings, there is illustrated another form of a device constructed in accordance with the teachings of the invention. For the purpose of clarity diaphragm blades, a bell crank for actuating the same and a view finding system such as 13, 9 and 15—16 shown in FIG. 1 are omitted. A device illustrated in FIG. 5 comprises a pair of aligned rockable levers one of which is similar to the lever 6 shown in FIG. 1 except that the omission of a warning element and designated similarly by the reference numeral 6f and the other 5 of which includes one arm resiliently pressing against a projection 4c formed on an operating rod 4 by the action of a tensioning spring 8 disposed therebetween and the other arm having a free end portion which, in turn is provided on the upper side as viewed in FIG. 5 with a protrusion 5a extending throughout an effective range over which an indicating pointer 2 of a galvanometer 1 can be moved or swung in accordance with an amount of light falling upon a photocell of an exposure meter (not shown) from an object to be photographed whereby the indicating pointer indicates a light value for the object. The protrusion 5a is, therefore, coextensive with a protrusion 6g on the lever 6f such as that previously described in conjunction with FIG. 1. As in the protrusion 6a shown in FIG. 1, the protrusion 5a includes at both ends its edges 5b and 5c extending downwardly and substantially perpendicularly to the longitudinal axis of the lever 5.

The other arm of the lever 5 is further provided on a suitable portion thereof, for example, at its extremity with a colored warning element of transparent material 15 adapted to enter in and retrograde from an optical path of a view finder system (not shown). This warning element may be similar to that previously described in conjunction with FIG. 1.

If an operating rod 4 will be depressed the pair of levers 5 and 6f will be rotated or rocked about their common fulcrum 7 in the counterclockwise direction as viewed in FIG. 5 whereby the indicating pointer 2 as having displaced above the same will be pressed against a holding stationary plate 3 by the protrusions 5a and 6g.

In this case it is to be noted that the levers 5 and 6f are constructed and arranged such that the first protrusion 5a presses first the indicating pointer 2 against a holding stationary plate 3 to prevent any movement of the pointer and then the second protrusion 6a contacts the pointer. With the protrusions 5a and 6g engaging the indicating pointer 2, the operating edge of the protrusion 5a is substantially parallel to the lower side of the holding plate 2 whereas the operating edge of the protrusion 6g is tilted to the same.

Other components of the device shown in FIG. 5 are similar to the corresponding components shown in FIG. 1 and need not be described.

From the foregoing it will be recognized that, with the indicating pointer 2 lying within its effective range or above the protrusions 5a and 6g the downward movement of the operating rod 4 effects the counterclockwise rotational movement of the levers 5 and 6f to press and hold the indicating pointer against the holding plate 3 by the protrusion 5a and then to contact the protrusion 6g with the pointer whereby a diaphragm aperture is controlled in accordance with the position of the pointer relative to the tilted edge of the protrusion 6g as in the device shown in FIG. 1. Alternatively if the pointer 2 will be outside its effective range or on the left side of the lefthanded ends of the protrusion 5a and 6g or on the right side of the righthanded end of the same as viewed in FIG. 5 then the downward movement of the operating rod 4 will effect the counterclockwise rotational movement of the levers 5 and 6f until the latter will abut against a stopper 18 whereupon the levers will be stopped to be further moved. Simultaneously with the movement of the lever 5, the warning element 15 will enter the optical path of the view finder system to warn the user that the indicating pointer 2 is outside its effective range. This is shown in FIG. 6 wherein the lever 5 is illustrated in its operated position when the pointer 2 has been excessively swung.

Referring now to FIG. 7 of the drawings, there is illustrated a modification of the device shown in FIG. 1. A device illustrated comprises a pair of aligned levers 51 and 61 each including one two-part arm adapted to be operatively coupled to a shutter mechanism (not shown) or diaphragm mechanism (not shown) with the remaining portions substantially similar to the corresponding portion of the device shown in FIG. 1. As show in FIG. 7, each of the arms 120a and 121a has one branch arm 120 or 121 with respective slots 125 and 126 therein through which extend stop pins 123 and 124 respectively. Each of the arms has another branch, the branch 120a having a protrusion 120b thereon with a contour adapted to adjust the diaphragm aperture in accordance with the indicator element, and the branch arm 121a having a protrusion 121b thereon for limiting the movement of this branch arm when the indicator element is within the effective range. The branch arm 120a also has the warning element 15 thereon.

An arrangement illustrated in FIG. 8 is substantially similar to that shown in FIG. 5 except that a pair of controlling levers 52 and 62 engage an operating rod 41 for a shutter (not shown) on the underside of a projection 41a secured thereto and that the rod 41 is normally biased downwardly by the action of spring 41b. The operating rod 41 includes its lower end engaging an intermediate lever 41d at one end which, in turn includes the other end adapted to be depressed directly or indirectly by a shutter pushbutton (not shown) in the direction of arrow illustrated in FIG. 3. The depression of the other end of the intermediate lever 41d tends to move upwardly the operating rod 41 to thereby allow the pair of the controlling levers 52 and 62 in the counterclockwise direction as viewed in FIG. 8. Therefore, it will be apparent that the device shown in FIG. 8 will be operated in the same manner as does the device previously described in conjunction with FIG. 1.

If an optical path of a view finder system is far away from a controlling lever such as the lever 5 or 6, a warning element can be operatively connected to the lever through any suitable intermediate connecting element. As an example, FIG. 9 illustrates a manner in which a colored warning element of transparent material 15a is operatively connected to a controlling lever 5 or 6 at one end through a bell crank 18a. It will be seen that the rotational movement of the lever 5 or 6 in the counterclockwise direction as viewed in FIG. 9 will cause the warning element 15a to enter the optical path of the view finder system represented by a object glass 16.

Referring now to FIG. 10 of the drawings, there is illustrated an arrangement embodying another aspect of the invention. An arrangement illustrated comprises a device for locking an operating rod for releasing a shutter when an indicating pointer in an exposure meter is not within its effective range, or substantially at zero position or excessively swung. Other components are substantially identical in construction and operation with the corresponding components shown in FIG. 5 and need not be described.

As shown in FIG. 10, a controlling lever 5 including a first protrusion 5a such as that previously described in conjunction with FIG. 5 is provided, preferably adjacent to the position of its fulcrum (which is diagrammatically designed at dotted-and-dashed line 7) with a rising branch arm 20 having its free or upper end connected to one end of a bar 21 through a connecting rod 22 provided on the upper side, as viewed in FIG. 10, with a stepped portion comprising two steps 22a and 22b. The bar 21 includes the other end pivotably mounted to a pivot (which is diagrammatically designated at dotted-and-dashed line 23) to a stationary member (not shown). The branch arm 5a, the connecting rod 22 and the bar 21 cooperate with a virtual bar connecting the pivot and a suitable point on the branch arm to form a so-called quadric lever chain. Thus, the rocking or rotational movement of the lever 5 can be converted into the longitudinal movement of the connecting rod 22. To effect this longitudinal movement of the rod 22, the same is connected to the branch arm 20 through a pin and a slot for slight movement in the longitudinal direction of the branch arm and guided by a stationary guide member 22' shown in FIG. 14 wherein the quadric lever chain is illustrated in its operated state.

It is now assumed that as an amount of light from an object to be photographed falls upon a photocell of an exposure meter (not shown) that an indicating pointer 2 of a galvanometer 1 has been swung above a first and a second protrusion 5a and 6a respectively of levers 5 and 6, that is to say, within its effective range as shown in FIG. 11. Then the depression of an operating rod 4 effects the rotational or rocking movement of levers 5 and 6 in the counterclockwise direction as viewed in FIG. 10 to first press the pointer 2 against a holding staitonary plate 3 by the first protrusion 5a to thereby prevent any movement of the pointer (see FIG. 12) and then to raise the second protrusion 6a until the same will be brought into contact with the pressed pointer 2 in the same manner as previously described. Then a diaphragm aperture determined by the positions of a pair of diaphragm blades 14 will be adjusted to the optimum stop number dependent upon the magnitude of rotational movement of the lever 6. Since the angular displacement of the lever 5 is small, the connecting rod 22 can not be moved sufficiently to bring the higher step 22a in a position immediate below the projection 4b on the operating rod 4. The projection 4b faces the lower step 22b of the rod 22 and hence the operating rod 4 can be depressed.

Further depression of the operating rod 4 can release a shutter mechanism to provide the optimum exposure.

Assuming that the indicating point 2 has been scarcely or excesively swung to be positioned outside its effective range that the operating rod 4 is depressed to rotate or rock the levers 5 and 6 counterclockwise until the same will abut against a stopper 18 without a fear that the first and second protrusions 5a and 6a respectively would contact the pointer (see FIG. 13 illustrating the pointer 2 excessively swung). Under these circumstances, the connecting rod 22 is moved leftward as viewed in FIGS. 10 to 12 to position the higher step 22a of the rod 22 immediately below a projection 4b on the operating rod 4. This prevents further depression of the operating rod 4 and accordingly the shutter releasing operation can not be performed.

It is to be understood that any suitable means other than the quadric lever chain illustrated may be used in order to prevent further depression of the operating rod 4.

If desired, one of the levers 5 and 6 may be provided with a colored warning element of transparent material or the like secured to one end as shown at dotted-and-dashed line 15 or operatively connected thereto as shown in FIG. 9. The warning element 15 is arranged to enter an optical path of a view finder system represented by an object glass 16 upon raising the operating edge formed on that lever without the edge contacting the pointer. With this arrangement, the shutter releasing operation is not only inhibited but also the warning element 15 having entered the view filed of the view finder system warns the user against relying upon a diaphragm mechanism interlocking with an exposure meter.

If a photographic camera equipped with a device for locking a shutter releasing element in its inoperative position a safety device such as that above described is desired to be used to take a flashlight photograph at a place where an indicating pointer of an exposure meter is not appreciably swung then the safety device will interfere with the shutter releasing operation. Therefore, it is necessary to render a manually operated diaphragm mechanism effective while the safety device is released. Means for accomplishing this purpose are illustrated in FIGS. 15 to 17.

An arrangement shown is substantially identical in construction and operation with that shown in FIG. 10 except for the additional provision of means for rendering a manually operated diaphragm mechanism effective and for releasing the safety device as above described. Therefore, said additional means will now be described.

As shown in FIG. 15, a manually operated ring 25 for controlling a diaphragm aperture is disposed in the front of a pair of diaphragm blades 14 for rotational movement about an optical axis of a photographic objective (not shown). The controlling ring 25 is provided on the rear end or that end thereof facing the diaphragm blades with a partially peripheral cam portion 25a extending toward the diaphragm blades along the optical axis of the photographic objective and also on the internal peripheral surface with a partial cam surface 25b extending inwardly. A switching rod 26 is disposed substantially in parallel relationship to said optical axis for sliding movement but against rotational movement and normally biased toward the controlling ring 25. The switching rod 26 is provided on that end thereof near the ring 25 with a lateral pin 26a adapted to be always pressed against the rear end face of the ring 25 and includes at the other end a bevelled face 26b. A locking lever 27 is pivotably mounted to its fulcrum diagrammatically designated at dotted-and-dashed line 28 and normally biased by a spring 29 in the clockwise direction as viewed in FIG. 15. The lever 27 includes one end portion resiliently contacting the bevelled end face 26b of the rod 26 and the other end portion adapted to detachably engage a bent end portion 5e formed on the free end of the lever 5 which is provided with a first protrusion 5a.

With the arrangement above described, the controlling ring 25 can be rotated to align the mark "Auto" on the outer periphery thereof with a fixed reference mark 30 (see FIG. 15). Under these conditions, the locking rod 26 is rotated clockwise by the action of the spring 29 to thereby disengage the end portion 27a from the bent end portion 5e of the lever 5 while a pin 10a of a bell crank 10 for controlling the pair of diaphragm blades 14 is brought into its operating position where the same can be freely moved to control a diaphragm aperture without a fear that the pin 10a would contact the internal cam surface 25b of the controlling ring 25. Therefore, it will be appreciated that the arrangement of FIG. 15 under the state just described is operated in the same manner as does the arrangement shown in FIG. 10.

If it is desired to take a flashlight photograph when the pointer 2 of the exposure meter is not appreciably swung or if it is desired to take a photograph by using any desired diaphragm aperture not controlled by the exposure meter then the controlling ring 25 can be rotated to align any desired stop number of a diaphragm scale (see FIG. 16) graduated on the outer periphery of the ring with the fixed reference mark 30. Under these conditions, the cam portion 25a of the controlling ring 25 will retrogate the switching rod 26 through the lateral pin 26a to move the locking lever 27 so as to slidably move the one end thereof along the bevelled end portion 26a of the rod 26 whereby the end portion 27a will engage the bent end portion 5e of the lever 5. This engagement of the locking lever 27 with the controlling lever 5 restrains the rotational or rocking movement of the latter lever 5 in the counter-clockwise direction as viewed in FIG. 15.

On the other hand, the internal cam surface 25b of the controlling ring 25 has controlled the pin 10a to adjust the diaphragm aperture to a desired stop number manually set. Then an operating rod 4 can be freely depressed to take the desired photograph because the depression of the operating rod 4 is not prevented by the connecting rod 22 of the safety device as previously described in conjunction with FIGS. 10 to 14.

It is to be understood that, in order that the diaphragm controlling ring 25 including cam means is rotated to restrain the rocking movement of the controlling lever 5 there may be used any suitable intermediate operating means other than those illustrated in FIG. 15 and described.

FIG. 18 shows a modification of the arrangement illustrated in FIG. 15. The modification comprises a pair of the aforesaid levers 5 and 6 including secured thereto a pair of pins 5f and 6e respectively which, in turn are connected to each other by a spring 31 whereby the pin 5f presses against the adjacent portion of the lower side of the lever 6. In this construction, the pair of levers 5 and 6 can include a common one arm resiliently engaging an operating rod 4.
an operating rod 4.

FIG. 19 shows a modification in which the controlling device shown in FIG. 15 is included in the form of device shown in FIG. 7. A device illustrated comprises a pair of aligned levers 51 and 61 each including one two-part arm adapted to be operatively coupled to a shutter mechanism (not shown) or diaphragm mechanism (not shown) with the remaining portions substantially similar to the corresponding portions of the device shown in FIG. 7, each of the arms 120a and 121a has one branch arm 120 or 121 with respective slots 125 and 126 therein through which extend stop pins 123 and 124 respectively. Each of the arms has another branch, the branch 120a having a protrusion 120b thereon with a contour adapted to adjust the diaphragm aperture in accordance with the indicator element, and the branch arm 121a having a protrusion 121b thereon for limiting the movement of this branch arm when the indicator element is within the effective range. The branch arm 121a has a bent end portion 5e on the end thereof adapted to cooperate with a lever 27 (not shown) similar to that shown in FIG. 15.

From the foregoing it will be appreciated that the present invention has provided a simple construction of a safety device for a photographic camera comprising warning means for visually warning the user that an indicating pointer of an exposure meter is located in its improper position and/or locking means for preventing a shutter from being released whenever the pointer would be at such a position. This eliminates completely any failure on photographing operation. Also the invention has provided switching means for switching a diaphragm mechanism from one state in which the same is controlled by an exposure meter to the other state in which it is manually controlled and vice versa.

While the invention has been described in conjunction with preferred embodiments thereof it is to be understood that various changes and modifications may be made without departing from the spirit and scope of the invention.

What I claim is:

1. In a photographic camera of the type including therein an exposure meter, means for releasing shutter means, and a diaphragm mechanism, the combination of an operating member adapted to be operatively connected to said means for releasing shutter means, and a rockable lever means resiliently engaging said operating member and including a control element adapted to be connected to said diaphragm mechanism for controlling a diaphragm aperture, said rockable lever means further including protrusion means extending substantially throughout an effective range over which an indicator element of the exposure meter can be moved and a warning element capable of entering an optical path of a view finder system, the arrangement being such that, when said indicator element is within said effective range the operation of said operating member causes said protrusion means to press the indicator element against a holding stationary member to thereby control the diaphragm aperture in accordance with the position of said indicator element relative to said protrusion means and that, when said indicator element moves outside said effective range the operation of said operating member causes said protrusion means to be moved sufficiently to bring said warning element into the optical path of the view finder system.

2. A photographic camera as claimed in claim 1 wherein said rockable means comprise a single rockable lever member.

3. A photographic camera as claimed in claim 1 wherein said rockable lever means comprise a pair of aligned rockable lever members one of which is provided with the warning element and a first protrusion for limiting the movement of said one lever member when the indicator element is within the effective range, the other of which is provided with the control element for controlling a diaphragm aperture and with a second protrusion having a contour adapted to adjust the diaphragm aperture in accordance with the position of the indicator element relative to the same, said protrusions constituting said protrusion means.

4. In a photographic camera of the type including therein an exposure meter, means for releasing shutter means, and a diaphragm mechanism, the combination of an operating member adapted to be operatively connected to said means for releasing shutter means, rockable lever means resiliently engaging said operating member and including a control element adapted to be connected to said diaphragm mechanism for controlling a diaphragm aperture, said rockable lever means further including protrusion means extending substantially through an effective range over which an indicator element of the exposure meter can be moved, and locking means coupled to said lever means for locking said operating member in its inoperative position, the arrangement being such that, when said indicator element is within said effective range, the operation of said operating member causes said protrusion means to press the indicator element against a holding stationary member to thereby control the diaphragm aperture in accordance with the position of said indicator element relative to said protrusion means and that, when said indicator element moves outside said effective range, the operation of said operating member causes said protrusion means to be moved sufficiently to render said locking means effective to thereby prevent further operation of the operating member.

5. In a photographic camera of the type including therein an exposure meter, means for releasing shutter means, and a diaphragm mechanism, the combination of an operating member adapted to be operatively connected to said means for releasing shutter means, rockable lever means resiliently engaging said operating member and including a control element adapted to be connected to said diaphragm mechanism for controlling a diaphragm aperture, said rockable lever means further including protrusion means extending substantially throughout an effective range over which an indicator element of the exposure meter can be moved and a warning element capable of entering an optical path of a view finder system, and locking means coupled to said lever means for locking said operating member in its inoperative position, the arrangement being such that, when said indicator element is within said effective range, the operation of said operating member causes said protrusion means to press the indicator element against a holding stationary member to thereby control the diaphragm aperture in accordance with the position of said indicator element relative to said protrusion means and that, when said indicator element moves outside said effective range, the operation of said operating member causes said protrusion means to be moved sufficiently to bring said warning element into the optical path of the view finder system and to render said locking means effective to thereby prevent further operation of the operating member.

6. A photographic camera as claimed in claim 4 wherein said rockable lever means comprise a pair of aligned rockable lever members one of which has coupled thereto the locking means for locking said operating member in its inoperative position and with a first protrusion for limiting the movement of said one lever member when the indicator element is within the effective range, the other of which is provided with the control element for controlling a diaphragm aperture and with a second protrusion having a contour adapted to adjust the diaphragm aperture in accordance with the position of the indicator element relative to the same, the protrusions constituting the protrusion means.

7. A photographic camera as claimed in claim 4 wherein said rockable lever means comprise a rockable lever member and a bifurcated arm to which said lever member is articulated, said arm having one branch arm provided with a first protrusion for limiting the movement of said one branch arm when said indicator element is within the effective range, and another branch arm provided with the control element for controlling a diaphragm aperture and with a second protrusion having a contour adapted to adjust the diaphragm aperture in accordance with the position of the indicator element relative to the same, said protrusions constituting the protrusion means.

8. A photographic camera as claimed in claim 4 further comprising manually operated ring means for controlling the diaphragm aperture and linkage means coupled between said ring means and said lever means operative to restrain the operation of said protrusion means for actuating said locking means.

9. A photographic camera as claimed in claim 4 wherein said rockable lever means comprise a pair of aligned rockable lever members one of which has thereon the locking means for locking said operating member in its inoperative position and which has thereon a first protrusion for limiting the movement of said one lever member when the indicator element is within the effective range, and which further has thereon the warning element, the other of which is provided with the control element for controlling a diaphragm aperture and with a second protrusion having a contour adapted to adjust the diaphragm aperture in accordance with the position of the indicator element relative to the same, said protrusions constituting the protrusion means.

10. A photographic camera as claimed in claim 4 in which said rockable lever means comprise two aligned rockable lever members and two aligned bifurcated arms to which said lever members are respectively articulated, each said arm having one branch provided with means for limiting the movement of said one branch arm, one of said arms having another branch arm provided with a first protrusion for limiting the movement of said one arm when the indicator element is within the effective range, and the other of said arms having another branch arm provided with said control element for controlling a diaphragm and with a second protrusion having a contour adapted to adjust the diaphragm aperture in accordance with the position of the indicator element relative to the same, said protrusions constituting the protrusion means.

11. A photographic camera as claimed in claim 1 wherein said rockable lever means comprise a rockable lever member and a bifurcated arm to which said lever member is articulated, said arm having one branch arm provided with a first protrusion for limiting the movement of said one branch arm when said indicator element is within the effective range, and another branch arm provided with the control element for controlling a diaphragm aperture and with a second protrusion having a contour adapted to adjust the diaphragm aperture in accordance with the position of the indicator element relative to the same, said protrusions constituting the protrusion means.

12. A photographic camera as claimed in claim 1 in which said rockable lever means comprise two aligned rockable lever members and two aligned bifurcated arms to which said lever members are respectively articulated, each said arm having one branch provided with means for limiting the movement of said one branch arm, one of said arms having another branch arm provided with a first protrusion for limiting the movement of said one arm when the indicator element is within the effective range, and the other of said arms having another branch arm provided with said control element for controlling a diaphragm and with a second protrusion having a contour adapted to adjust the diaphragm aperture in accordance with the position of the indicator element relative to the same, said protrusions constituting the protrusion means.

References Cited in the file of this patent

UNITED STATES PATENTS

| | | |
|---|---|---|
| 2,058,532 | Tuttle | Oct. 27, 1936 |
| 2,981,165 | Estes | Apr. 25, 1961 |
| 2,999,438 | Nerwin | Sept. 12, 1961 |
| 3,000,282 | Noack | Sept. 19, 1961 |